April 17, 1962  C. C. MINTER  3,029,628
LEAK DETECTOR
Filed Oct. 28, 1958  3 Sheets-Sheet 1

INVENTOR
CLARKE C. MINTER

BY *Richard C. Reed*
ATTORNEY

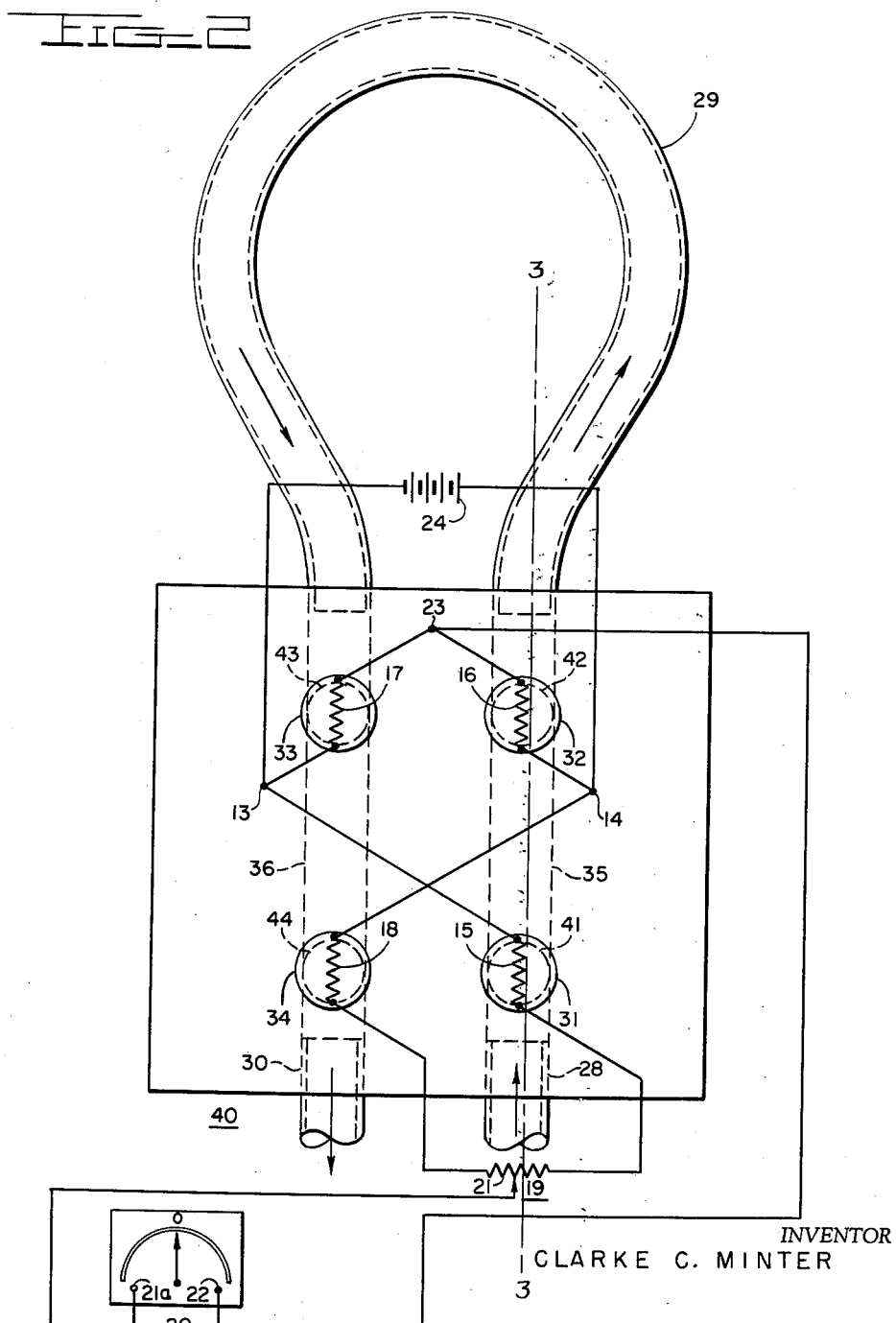

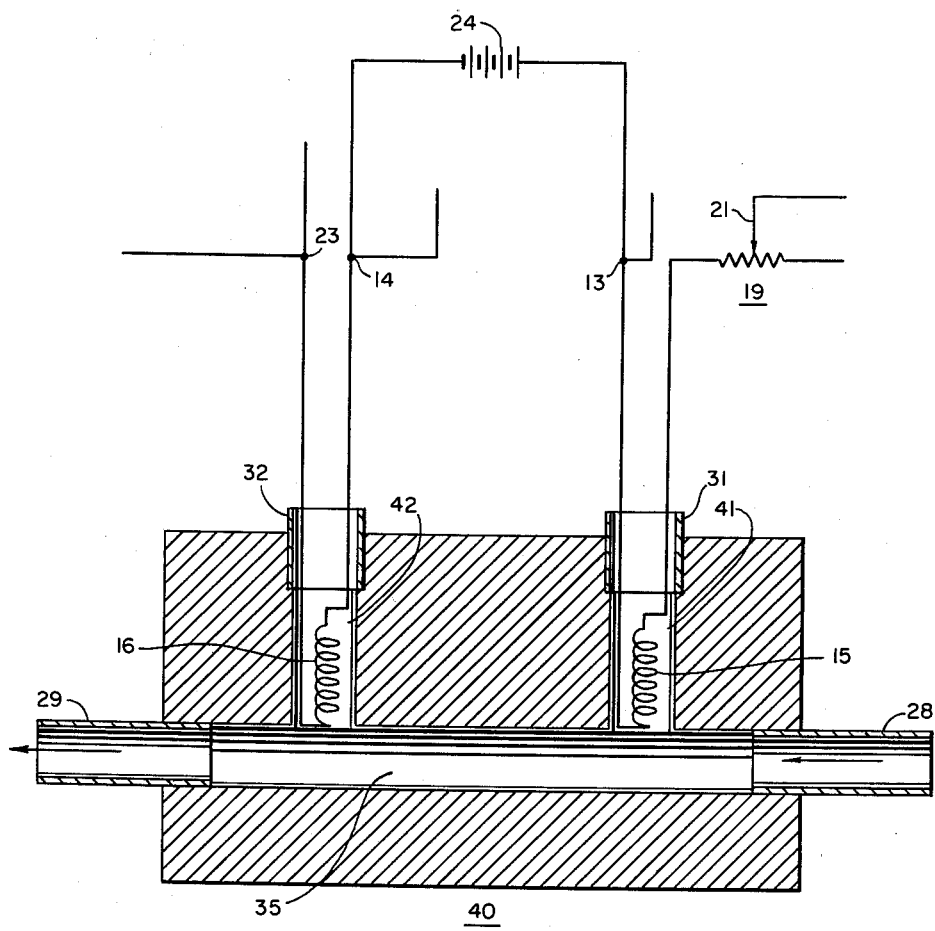

United States Patent Office 3,029,628
Patented Apr. 17, 1962

3,029,628
LEAK DETECTOR
Clarke C. Minter, 1623 35th St. NW., Washington, D.C.
Filed Oct. 28, 1958, Ser. No. 770,239
8 Claims. (Cl. 73—27)
(Granted under Title 35, U.S. Code (1952), sec. 266)

The invention described herein may be manufactured and used by or for the Government of the United States of America for governmental purposes without the payment of any royalties thereon or therefor.

This invention relates in general to devices for the detection of gases and in particular to such devices which embody a thermal conductivity Wheatstone bridge.

The prior art discloses a variety of gas analyzers using the thermal conductivity bridge. These analyzers generally consist of electrically heated filaments mounted in cells some of which contain the gas mixture to be analyzed while comparison cells contain a standard reference gas. Attempts to adapt the existing gas analyzers for use in detecting leaks in gas systems have not been successful because, among other reasons, it has not been possible to obtain the degree of sensitivity required in such detection. Many of the gas analyzers and leak detectors in the prior art use a reference filament enclosed in an evacuated tube thereby incorporating a source of error through molecules emanating from the enclosure and changing the reference condition. Other prior leak detectors have filaments disposed some distance from the flow of gas thereby reducing the sensitivity of the detector. Many of the prior art devices include in the path of the gas to be tested driers and absorbers or other such equipment which restrict the flow of gas thereby preventing uniform flow and causing a difference in pressure in one branch of the gas path over another branch. No known leak detector provides an accurate indication of the presence of minute concentrations of leaking test gas outside of the mass spectrometer, which is costly, complex and bulky and therefore undesirable for use in many restricted areas, and the halogen leak detector which is only fairly sensitive and whose sensitivity diminishes with increasing concentration.

Accordingly, it is an object of the present invention to provide maximum sensitivity in the detection of leaks through the use of a probe gas.

Another object of this invention is to provide a leak detector having filaments in branches of the bridge which extend into or are adjacent to the gas passage.

A further object of the present invention is to provide a leak detector having an unrestricted passage of uniform diameter through which the test gas or a probe gas passes.

A further object of the present invention is to provide an accurate leak detector in the form of a thermal conductivity bridge capable of having opposite deflections of a nullpoint indicator produced by the passage of a bubble of probe gas thereby giving clear indication of the presence of a leak.

A further object of this invention is to provide a thermal conductivity leak detector which is easily portable and can be used interchangeably to locate leaks in either pressure systems or vacuum systems without modification.

Other objects and advantages of this invention will become apparent upon a careful consideration of the following description when read in conjunction with the accompanying drawings in which like reference numerals designate like parts throughout the figures thereof and wherein:

FIG. 2 shows a plan view partly cut away of the first embodiment of the invention.

FIG. 3 is a cross section of a portion of the embodiment shown in FIGS. 1 and 2, for example along line 3—3 in FIG. 2.

Figure 1:
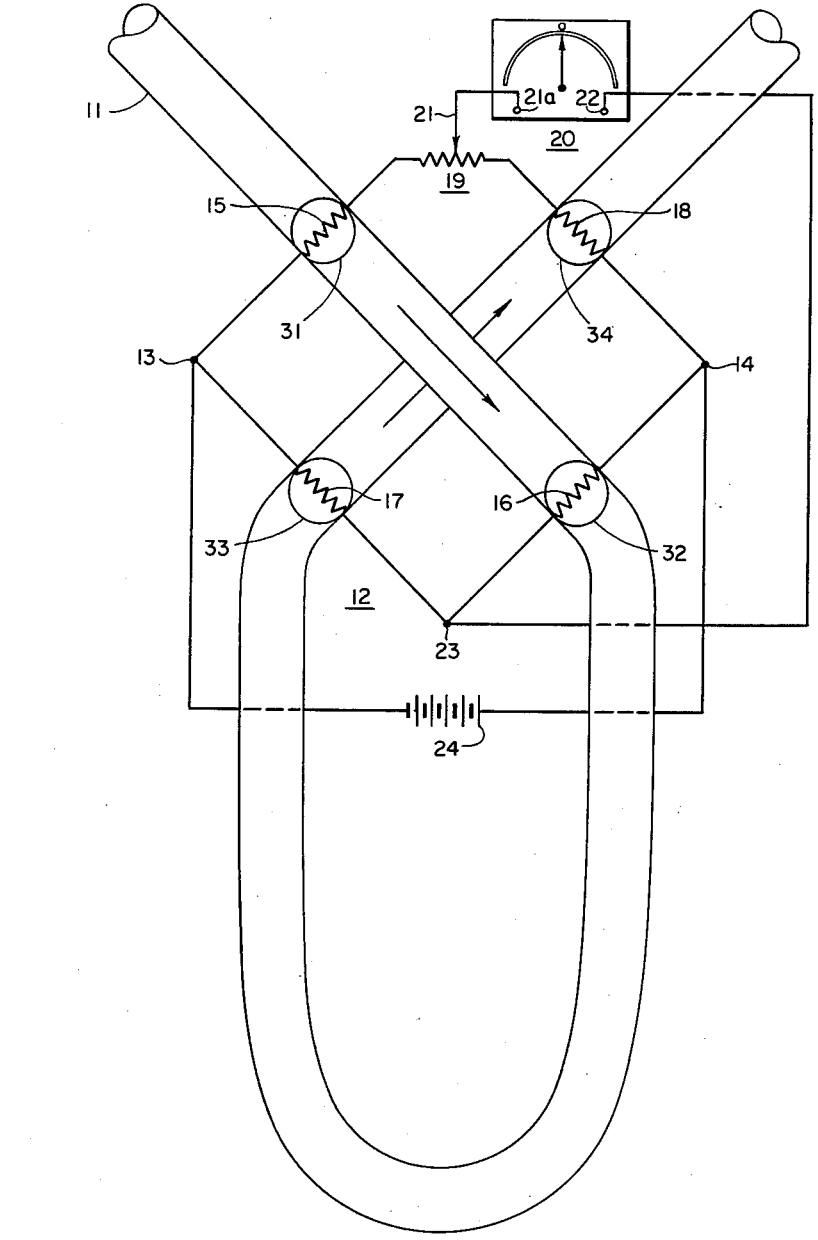
FIG. 1 is a schematic diagram of a first embodiment of the invention.

In accordance with the teachings of the present invention, a leak detector is provided which incorporates the advantages of a thermal conductivity bridge with the sensitivity of a mass spectrometer, and in addition can be used interchangeably to detect leaks in a pressure system or a vacuum system. Using helium or hydrogen as a test gas, the system to be checked is either filled under pressure or evacuated and sprayed over suspect areas with the test gas. With the thermal conductivity bridge balanced under ambient conditions, the presence of as little as 1 part per million (p.p.m.) of test gas in the flow through the detector will be indicated by deflection of the galvanometer pointer. If a spurt or bubble of test gas flows through, the pointer will deflect in one direction and then almost immediately in the opposite direction. Where the flow of test gas is continuous the pointer will deflect and then return to the balance condition when a pressurized system is being tested, and will deflect and remain deflected when an evacuated system is being tested. Disposition of four thermal conductivity filaments adjacent to and along a uniform gas flow path, with alternate branches of a thermal conductivity bridge encountered in sequence by the gas, is primarily responsible for the high sensitivity and compactness of the leak detector about to be described. The quick reaction to a low concentration of test gas defines within workable limits the area in which a leak is located, while the opposite swings of a potentiometer pointer give a firm indication of a leak.

Referring to FIG. 1, junctions 13 and 14 in Wheatstone bridge 12 are interconnected via two paths, the filaments 17 and 16 in series and the filament 15, variable potentiometer 19 and filament 18 in series, respectively. Sliding terminal 21 on potentiometer 19 is connected to terminal 21a of galvanometer 20 while terminal 22 of the galvanometer is connected to junction 23 which is at the midpoint between filaments 16 and 17. Tube 11 represents schematically a passage for gas with openings to accommodate filaments 15, 16, 17 and 18, respectively, the openings being sealed at their outer ends by fittings 31, 32, 33 and 34, respectively. The Wheatstone bridge is energized by D.C. power source 24 at junctions 13 and 14.

In FIG. 2, which depicts a preliminary embodiment of this invention, the block 40 provides vacuum tight passages 35 and 36 and cells 41, 42, 43 and 44 through which test gas flows. Tubes 28, 29 and 30 are inserted into vacuum tight fittings in block 40. D.C. power source 24, which may be, for example, about 4 volts, is connected to junctions 13 and 14 from which wires diverge to filaments 15 and 17 and to filaments 16 and 18, respectively. Potentiometer 19 is connected between filaments 15 and 18, and galvanometer 20 is connected between junction 23 and potentiometer 19. Fittings 31, 32, 33 and 34 contain sealed wires leading to filaments 15, 16, 17 and 18, respectively, which are disposed in the junction between their respective cell and passage 35 or 36. Filaments 15, 16, 17 and 18 preferably are in proportion such that 15 is to 18 as 17 is to 16 and consist of wires of known resistance variation with temperature which carry sufficient current to raise their temperatures appreciably above the ambient temperature.

Referring to FIG. 3, which shows the embodiment of FIG. 2 in section along line 3—3, block 40 is drilled or otherwise hollowed to form cells 41 and 42 in which filaments 15 and 16, respectively, are disposed. Filaments 15 and 16 extend substantially to the periphery of passage 35, while filaments 17 and 18, not shown in FIG.

3, extend substantially to the periphery of passage 36 in the same manner. Tube 29 is of such length as to contain an expected bubble of test gas while the distance between filaments 15 and 16, and that between filaments 17 and 18, is substantially shorter than the length of tube 29 so that an expected bubble will span that distance. The relation of a short distance between filaments 15 and 16, and 17 and 18, to the substantially longer distance between filaments 16 and 17 is to cause differing deflections of the galvanometer pointer when there is a continuous stream of probe gas as against the passage of a short stream, or bubble, of test gas through the detector. The differing deflections are explained in more detail in the following paragraphs.

Prior to operation with a pressurized system, a conventional flexible tube, preferably of metal, with a narrow opening at one end is attached to tube 28. An aspirator is attached to tube 30 to promote the flow of gas. Helium or hydrogen, or a suitable probe gas such as Freon-12, is then compressed in the system and, with the aspirator operating, air is drawn through the leak detector continuously, permitting the bridge to be balanced under ambient conditions by varying the contact on potentiometer 19. After having balanced the bridge, the narrow opening at the end of tube 28 is passed over areas of the pressure system where leaks may be expected. When a leak is passed closely enough to draw into the detector helium or hydrogen having a concentration of approximately 0.5 part per million (p.p.m.) or more, the presence of such gas will be indicated by deflection of the galvanometer pointer. Assuming that only a small portion, or bubble, of test gas has entered the detector, its contact with the filament first met, number 15, will cool that filament when helium or hydrogen is used and heat it when Freon-12 is used, thus causing an unbalanced condition by decreasing or increasing, respectively, its resistance in its portion of the path of the bridge thereby causing a deflection of the galvanometer pointer. Because filament 16 is in an opposite portion of a parallel path of the bridge from filament 15, the path containing filament 16 will become unbalanced in the same direction of pointer movement as for the unbalance due to filament 15.

Since the distance along tube 29 from filament 16 to filament 17 is several times greater than the distance from filament 15 to filament 16, a bubble can have passed filament 16 before its leading edge reaches filament 17. Thus, it is possible for the galvanometer pointer to be moving toward the balance position before test gas reaches filament 17. When test gas contacts filament 17, it will produce a deflection of the galvanometer pointer opposite to that noted upon contact with filament 15 because the opposing portion of the bridge path will have become unbalanced. Contact of the test gas with filament 18 will supplement the motion caused by contact with filament 17. A double indication of the presence of a leak is thus provided when a bubble of test gas of relatively short span enters the leak detector from a pressurized system.

On the other hand, when a steady flow of test gas from a pressurized system enters the leak detector, the galvanometer pointer will deflect in only one direction and then return to the balance position. This difference in pointer motion results from having the bridge balanced when helium or hydrogen is in contact with all four filaments simultaneously.

Prior to operation with a vacuum system, input tube 28 is connected by a vacuum tight fitting to the system to be evacuated while output tube 30 is connected to a vacuum pump, not shown. When the system to be tested, and block 40, have been evacuated as fully as possible, bridge 12 is balanced and a small jet of gas is sprayed over those portions of the vacuum system where leaks are suspected. When a test gas such as helium or hydrogen enters the evacuated system and contacts the filaments of the bridge, two successive deflections of the galvanometer pointer occur in one direction followed by two in the opposite direction if a bubble of test gas has passed through block 40. It has been determined in testing a vacuum system for leaks that a continuous flow of test gas through the block will cause the galvanometer pointer to remain deflected despite test gas being in contact with all four filaments. This failure to return to a balanced condition is believed due to a pressure differential between the two pairs of cells, i.e., 41 and 42 in the inlet side and 43 and 44 in the outlet side, the lower pressure on the outlet side causing a smaller change in temperature in filaments 17 and 18 than exists concurrently in filaments 15 and 16.

Leaks of gases other than helium and hydrogen can be discovered and located through operation of the present invention. For example, Freon-12 leaks from refrigeration or similar equipment located in closed or confined spaces can be hazardous if not located quickly, and with the present invention a change of concentration of Freon in air of approximately 1 p.p.m. can be swiftly detected. Of course to indicate such a minute concentration as 1 p.p.m. a bridge amplifier, not shown in the figures, may be used to magnify the signal.

In summary there is provided by the present invention a leak detector which will indicate the presence of a low concentration of test gas such as helium or hydrogen, or other gases having a thermal conductivity sufficiently different from that of air, by opposite deflections of the nullpoint indicator when a bubble or spurt of such gas passes through the detector and by a unidirectional deflection followed by a return to the nullpoint in cases where a pressurized system is filled with the test or similar gas. The detector provided is compact, portable and relatively low in cost thereby enabling its use in close confinements as well as isolated spaces.

Many modifications and variations of the present invention are possible pursuant to the above teachings. It is therefore to be understood that its practice is not to be limited by the specific examples in the foregoing description and that this invention is only to be limited by the scope of the appended claims.

What is claimed is:

1. A leak detector for determining the location of leaks in gas systems comprising an energy source, first and second thermal responsive impedance means electrically connected in series across said energy source, third and fourth thermal responsive impedance means electrically connected in series across said energy source, a potentiometer connected between said first impedance means and said second impedance means in series therewith, the impedance ratio between said first and second impedance means at a selected temperature being substantially the same as the impedance ratio between said third and fourth impedance means at said selected temperature such that said impedance means form a balanced bridge network, each of said impedance means having a similar resistance variation with temperature characteristic, means for indicating the balance condition in said bridge network, an unobstructed continuous gas flow path of substantially uniform cross section having an input end for introducing gas and an output end for exiting said gas, and means for producing gas flow between said input end and said output end of said path, said first, fourth, third and second impedance means disposed in that sequence in said gas flow path at selected intermediate points between said input end and said output end thereof, the gas flow path between said first and fourth and between said third and second impedance means being substantially shorter than the gas flow path between said fourth and third impedance means.

2. A leak detector for determining the location of leaks in gas systems comprising an energy source, first and second thermal responsive impedance means electrically connected in series across said energy source, third and fourth thermal responsive impedance means electrically connected in series across said energy source, a potentiometer connected between said first impedance means and said second impedance means in series therewith, the impedance ratio between said first and second impedance means at a selected temperature being substantially the same as the impedance ratio between said third and fourth impedance means at said selected temperature such that said impedance means form a balanced bridge network, each of said impedance means having a similar resistance variation with temperature characteristic, means for indicating the balance condition in said bridge network, an unobstructed continuous gas flow path of substantially uniform cross section having an input end for introducing gas and an output end for exiting said gas, each of said impedance means being disposed in said gas flow path, and means for producing gas flow between said input end and said output end of said gas flow path, said first, fourth, third and second impedance means disposed in that sequence in said gas flow path at selected intermediate points between said input end and said output end thereof, the gas flow path between said first and fourth and between said third and second impedance means being substantially shorter than the gas flow path between said fourth and third impedance means, the sequence of impedance means in said gas flow path providing supplemental indications of unbalance first in one direction due to gas flow past said first and fourth impedance means and next in an opposite direction due to gas flow past said third and second impedance means.

3. A leak detector for determining the location of leaks in gas systems comprising an energy source, first and second thermal responsive impedance means electrically connected in series across said energy source, third and fourth thermal responsive impedance means electrically connected in series across said energy source, a potentiometer connected between said first impedance means and said second impedance means in series therewith, the impedance ratio between said first and second impedance means at a selected temperature being substantially the same as the impedance ratio between said third and fourth impedance means at said selected temperature such that said impedance means form a balanced bridge network, each of said impedance means having a similar resistance variation with temperature characteristic, means for indicating the balance condition in said bridge network, an unobstructed continuous gas flow path of substantially uniform cross section having an input end for introducing gas and an output end for exiting said gas, each of said impedance means being disposed in a cell, each of said cells having an open end at the periphery of said gas flow path and a vacuum tight sealed end opposite said open end, each of said impedance means being connected to said bridge by wires extending through said vacuum tight sealed ends, each of said impedance means being disposed in said gas flow path, and means for producing gas flow between said input end and said output end of said gas flow path, said first, fourth, third and second impedance means disposed in that sequence in said gas flow path at selected intermediate points between said input end and said output end thereof, the distance along said gas flow path between said first and fourth and between said third and second cells being substantially shorter than the distance along said gas flow path between said fourth and third cells.

4. A leak detector for determining the location of leaks in gas systems comprising an energy source, first and second thermal responsive impedance means electrically connected in series across said energy source, third and fourth thermal responsive impedance means electrically connected in series across said energy source, a potentiometer connected between said first impedance means and said second impedance means in series therewith, the impedance ratio between said first and second impedance means at a selected temperature being substantially the same as the impedance ratio between said third and fourth impedance means at said selected temperature such that said impedance means form a balanced bridge network, each of said impedance means having a similar resistance variation with temperature characteristic, means for indicating the balance condition in said bridge network, an unobstructed continuous gas flow path of substantially uniform cross section having an input end for introducing gas and an output end for exiting said gas, said first, fourth, third and second impedance means being disposed in a first cell, a fourth cell, a third cell and a second cell, respectively, each of said impedance means being disposed in said gas flow path, and means for producing gas flow between said input end and said output end of said gas flow path, said first, fourth, third and second impedance means disposed in that sequence in said gas flow path, the distance from said first cell to said fourth cell and from said third cell to said second cell being substantially equal, and the distance from said fourth cell to said third cell being substantially greater than the distance from said first cell to said fourth cell.

5. A leak detector for determining the location of leaks in gas systems comprising an energy source, first and second thermal responsive impedance means electrically connected in series across said energy source, third and fourth thermal responsive impedance means electrically connected in series across said energy source, a potentiometer connected between said first impedance means and said second impedance means in series therewith, the impedance ratio between said first and second impedance means at a selected temperature being substantially the same as the impedance ratio between said third and fourth impedance means at said selected temperature such that said impedance means form a balanced bridge network, each of said impedance means having a similar resistance variation with temperature characteristic, means for indicating the balance condition in said bridge network, an unobstructed continuous gas flow path of substantially uniform cross section having an input end for introducing gas and an output end for exiting said gas, said first, fourth, third and second impedance means being disposed in a first cell, a fourth cell, a third cell and a second cell, respectively, and means for producing gas flow between said input end and said output end of said gas flow path, said first, fourth, third and second impedance means disposed in that sequence in said gas flow path, the distance from said first cell to said fourth cell and from said third cell to said second cell being substantially equal, and the distance from said fourth cell to said third cell being substantially greater than the distance from said first cell to said fourth cell, the sequence of said impedances being such that the indication of an unbalanced condition due to gas flow past said first and fourth impedance means is opposite to said indication due to gas flow past said third and second impedance means.

6. A leak detector for determining the location of leaks in gas systems comprising an energy source, first and second thermal responsive impedance means electrically connected in series across said energy source, third and fourth thermal responsive impedance means electrically connected in series across said energy source, a potentiometer connected between said first impedance means and said second impedance means in series therewith, the impedance ratio between said first and second impedance means at a selected temperature being substantially the same as the impedance ratio between said third and fourth impedance means at said selected temperature such that said impedance means form a balanced bridge network, each of said impedance means having a similar resistance variation with temperature characteristic, means for indicating the balance condition in said bridge network, a continuous gas flow path of uniform cross section having an input end for introducing gas and an output end for exiting said gas, said first, fourth, third and second impedance means being disposed in a first cell, a fourth cell, a third cell and a second cell, respectively, and means for producing gas flow between said input end and said output end of said gas flow path, the distance from said first cell to said fourth cell and from said third cell to said second cell being substantially equal, and the distance from said fourth cell to said third cell being substantially greater than the distance from said first cell to said fourth cell, said first, fourth, third and second impedance means disposed in that sequence along said gas flow path, the arrangement of said cells being such that indication of an unbalanced condition due to gas flow past said first and fourth impedance means is opposite to said indication due to gas flow past said third and second impedance means, and said indication due to gas flow past said fourth and second impedance means supplements said indication due to gas flow past said first and third impedance means, respectively.

7. A leak detector for determining the location of leaks in gas systems comprising an energy source, first and second thermal responsive impedance means electrically connected in series across said energy source, third and fourth thermal responsive impedance means electrically connected in series across said energy source, a potentiometer connected between said first impedance means and said second impedance means in series therewith, the impedance ratio between said first and second impedance means at a selected temperature being substantially the same as the impedance ratio between said third and fourth impedance means at said selected temperature such that said impedance means form a balanced bridge network, each of said impedance means having a similar resistance variation with temperature characteristic, means for indicating the balance condition in said bridge network, and an unobstructed continuous gas flow path of substantially uniform cross section having an input end for introducing gas and an output end for exiting said gas, said first, fourth, third and second impedance means being disposed in a first cell, a fourth cell, a third cell and a second cell, respectively, said first, fourth, third and second impedance means disposed in that sequence in said gas flow path, said gas flow path and said cells having pressure tight fittings such that said leak detector may be used while connected to a vacuum system and maintain the integrity of said vacuum system.

8. A leak detector for determining the location of leaks in gas systems comprising an energy source, first and second thermal responsive impedance means electrically connected in series across said energy source, third and fourth thermal responsive impedance means electrically connected in series across said energy source, a potentiometer connected between said first impedance means and said second impedance means in series therewith, the impedance ratio between said first and second impedance means at a selected temperature being substantially the same as the impedance ratio between said third and fourth impedance means at said selected temperature such that said impedance means form a balanced bridge network, each of said impedance means having a similar resistance variation with temperature characteristic, means for indicating the balance condition in said bridge network, and an unobstructed continuous gas flow path of substantially uniform cross section having an input end for introducing gas and an output end for exiting said gas, said first, fourth, third and second impedance means disposed in a first cell, a fourth cell, a third cell and a second cell, respectively, said first, fourth, third and second impedance means disposed in that sequence in said gas flow path at selected intermediate points between said input end and said output end thereof, said gas flow path and said cells having pressure tight fittings such that said leak detector may be used while connected to a vacuum system and maintain the integrity of said vacuum system, said selected intermediate points of said impedance means being such that said bridge network will indicate an unbalanced condition due to gas flow past said impedance means.

References Cited in the file of this patent

UNITED STATES PATENTS

| 2,645,117 | Bendix | July 14, 1953 |
| 2,879,663 | Thomas | Mar. 31, 1959 |

FOREIGN PATENTS

| 914,458 | France | Oct. 9, 1946 |
| 929,936 | Germany | July 7, 1955 |

OTHER REFERENCES

Review of Scientific Instruments, Sept. 9, 1958, pp. 793–794.

Chemical Engineering, April 1947, pp. 112–114.

Halogen-Sensitive Leak Detector, Distillation Products, Eastman Kodak Co. Received July 9, 1953.

Consolidated Leak Detector, Bulletin CEC 1801 B, Consolidated Engineering Corporation. Received May 19, 1953.